Aug. 18, 1964    H. C. MOORE ETAL    3,144,873
DIVERTER VALVE FOR DISHWASHING APPARATUS
Original Filed Aug. 2, 1956                5 Sheets-Sheet 5
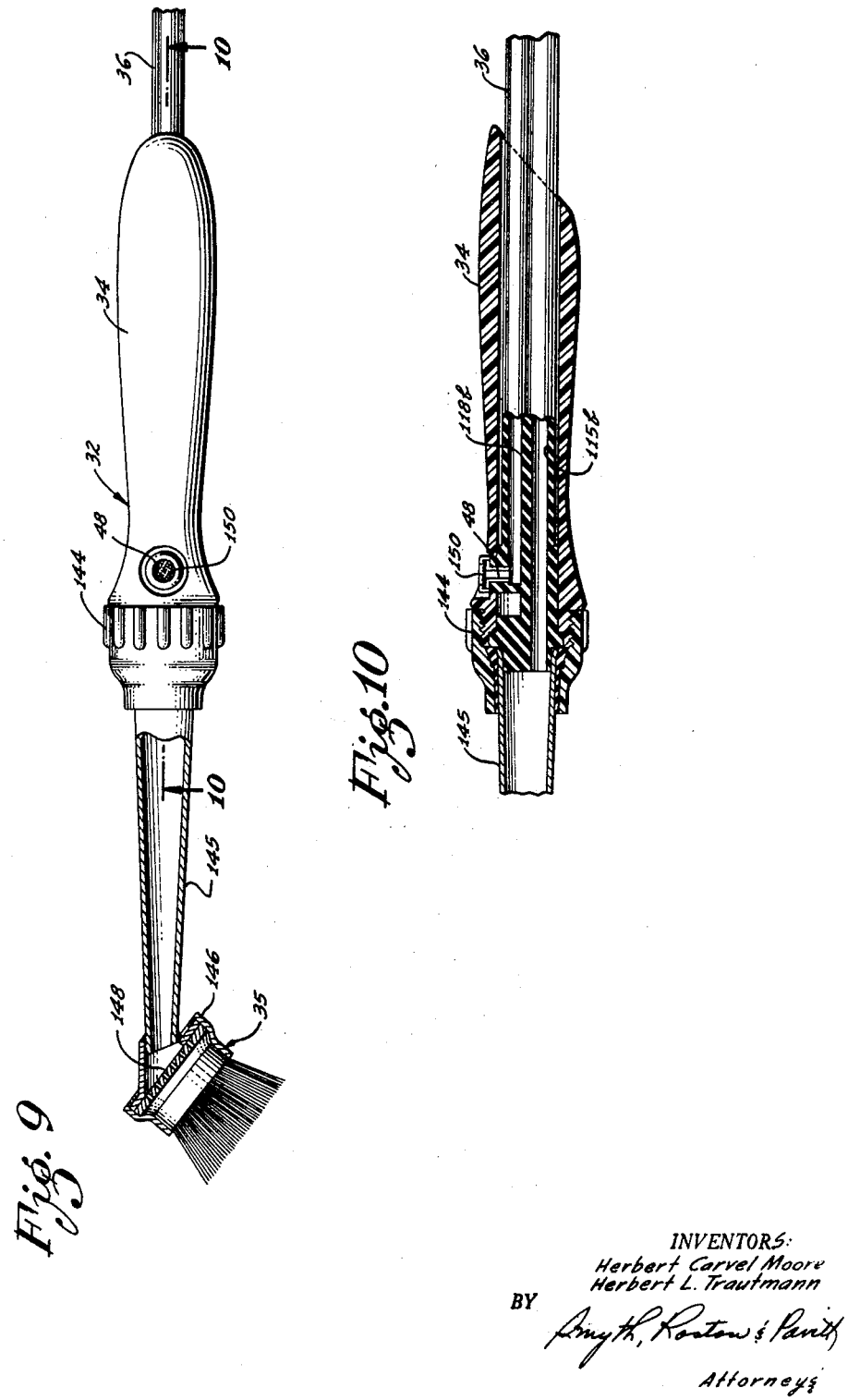
INVENTORS:
Herbert Carvel Moore
Herbert L. Trautmann
BY
Attorneys

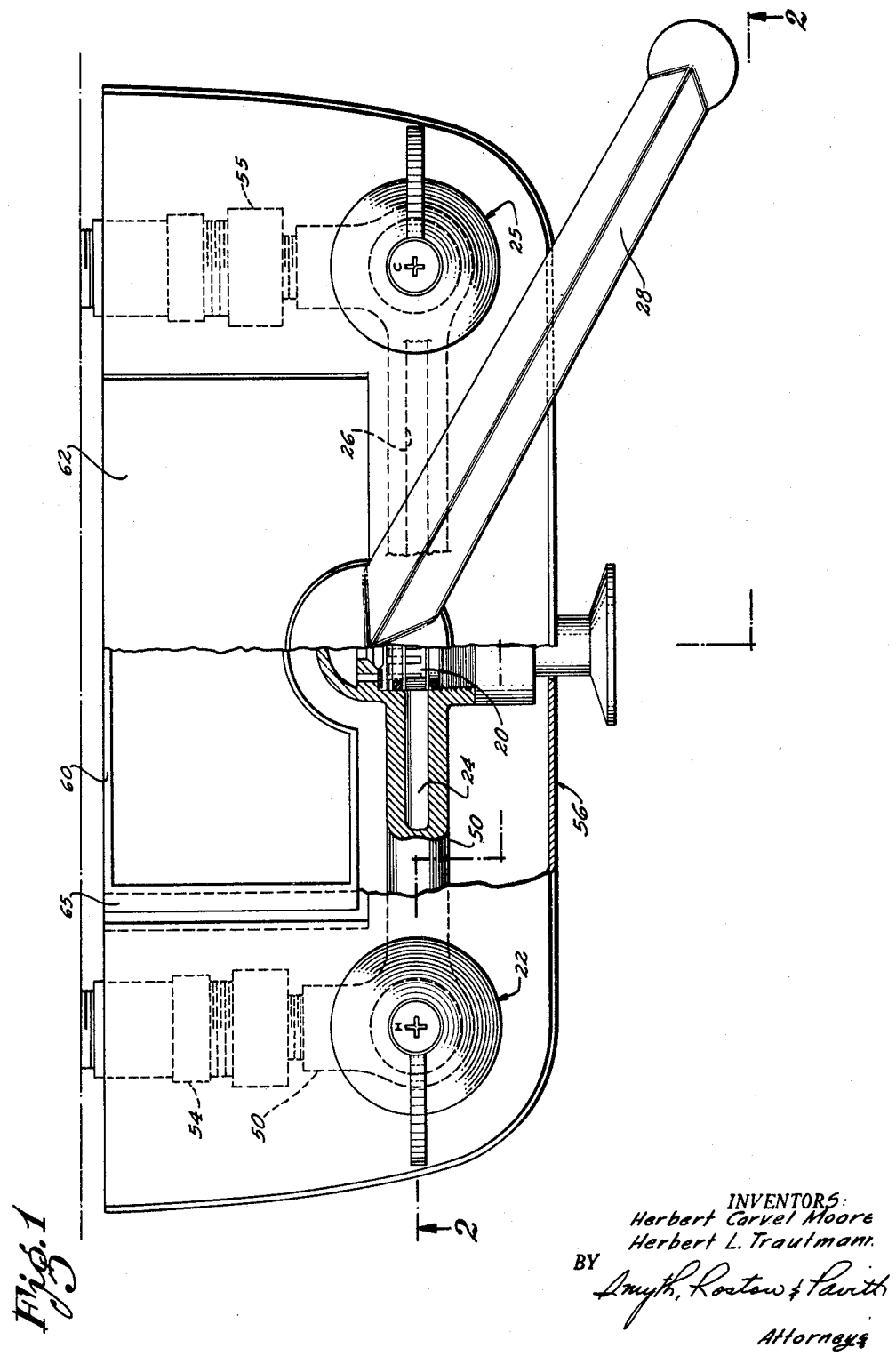

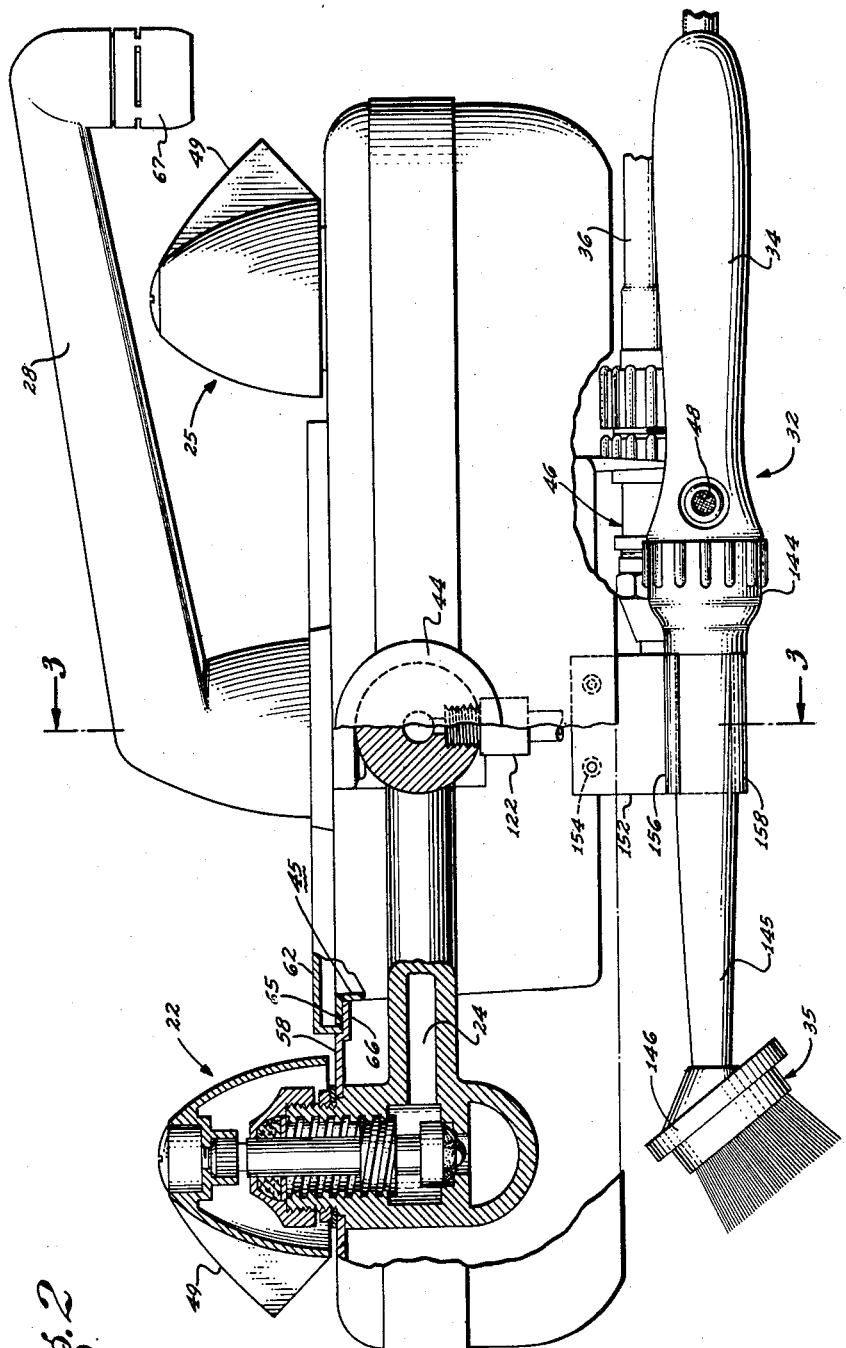

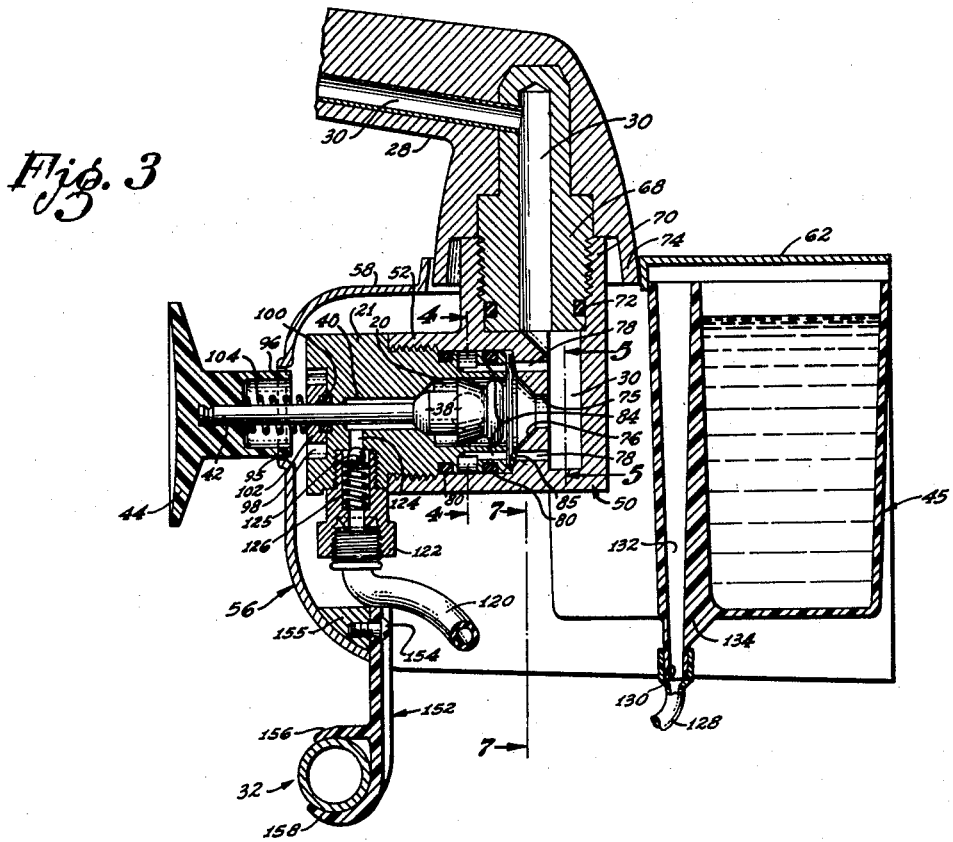
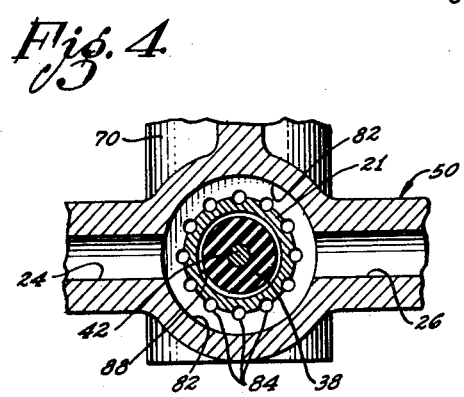
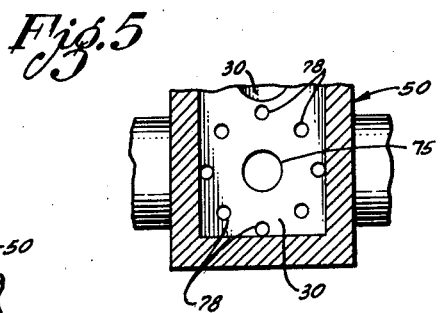

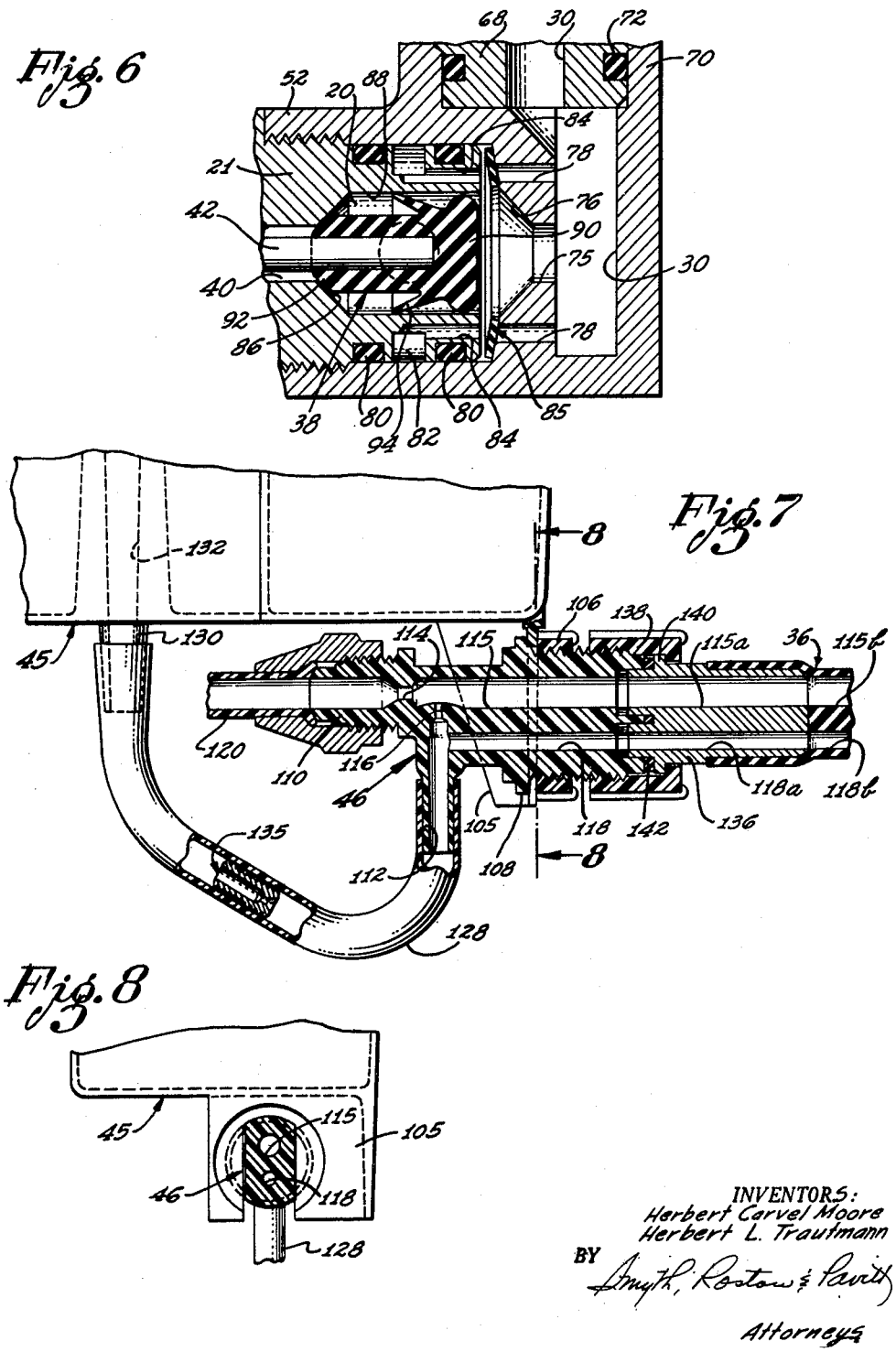

3,144,873
DIVERTER VALVE FOR DISHWASHING APPARATUS

Herbert Carvel Moore, Los Angeles, and Herbert L. Trautmann, San Marino, Calif., assignors to Electro-Way Corporation, a corporation of California
Original application Aug. 2, 1956, Ser. No. 601,812, now Patent No. 2,956,579, dated Oct. 18, 1960. Divided and this application Aug. 22, 1960, Ser. No. 51,130
7 Claims. (Cl. 137—119)

This invention relates to an apparatus for washing dishes and other objects by means of a stream of water or a mixture of water and detergent. Such an apparatus, for example, may be provided with a fountain-type hand brush for use as a kitchen fixture in a well known manner. This application is a division of our copending application, Serial No. 601,812, filed August 2, 1956, now issued Patent 2,956,579, dated October 18, 1960.

The installed apparatus which is connected to hot and cold water pipes to replace conventional sink plumbing has a diverter valve chamber. A spout which is preferably a swing spout, is provided in communication with the diverter valve chamber and replaces the usual spout for normal discharge of clear water. The fountain-type hand brush is part of what may be termed a hand brush assembly having a flexible hose that not only communicates with the diverter valve chamber but also communicates with a detergent container that is incorporated in the construction of the apparatus. Water from the diverter valve chamber may be diverted from the swing spout to the fountain-brush assembly by means of a diverter valve member in the diverter valve chamber and detergent may be supplied to the flexible hose assembly under manual control. Thus the operator has the choice of clear water flow through the swing spout or clear water flow through the fountain brush or a water-detergent mixture through the fountain brush.

In the usual apparatus of this type, the diverter valve member is operated by a knob on the upper side of the apparatus, which knob must be lifted vertically in an awkward manner to divert flowing water to the fountain brush. The present invention makes certain changes that reduce the required effort and entirely eliminate the usual awkwardness. The first change is to locate the diverter valve knob on the front of the apparatus, instead of the top, to bring the knob closer to the normal position of the user's hands and to lower the knob to the level of the hands. The second change is to reverse the operating procedure so that the knob is depressed rather than pulled out for diversion of water to the fountain brush. Only the simplest hand movement is required to push the knob back, the operation requiring minimum time and minimum effort.

Another feature of the invention is the provision of multiple highly effective safeguards against back flow into the water system from the fountain brush assembly. Such safeguards are vital to prevent contamination of the domestic water supply in the event a vacuum is created in the water pipes.

One of these safeguards is the provision of a conventional check valve in the outflow passage from the diverter valve chamber to the fountain brush assembly. A second safeguard is the incorporation of a check valve element in the construction of the diverter valve member itself. A third and highly important safeguard is the provision of a by-pass controlled by a check valve, this by-pass being upstream from the diverter valve and communicating with the swing spout. Whenever a reverse pressure differential occurs by reason of a vacuum in the water line, this by-pass opens automatically to break the vacuum by opening up a path directly from the diverter valve chamber to the atmosphere through the swing spout. The resultant path of backflow of air from the atmosphere is along surfaces that contact only pure water.

The various features and advantages of the invention will be understood from the following detailed description considered with the accompanying drawings.

In the drawings, which are to be regarded as merely illustrative:

FIGURE 1 is a plan view with parts broken away showing the presently preferred embodiment of the invention;

FIGURE 2 is a front elevation with parts broken away;

FIGURE 3 is a transverse sectional view taken as indicated by the line 3—3 of FIGURE 2;

FIGURE 4 is a fragmentary sectional view of the diverter valve chamber taken as indicated by the line 4—4 of FIGURE 3;

FIGURE 5 is a fragmentary sectional view taken as indicated by the line 5—5 of FIGURE 3 and showing a portion of the outflow passage to the spout with the series of by-pass bores communicating therewith;

FIGURE 6 is an enlarged fragment of FIGURE 3 showing the construction of the diverter valve chamber and the diverter valve member therein;

FIGURE 7 is a fragmentary section taken as indicated by the line 7—7 of FIGURE 3 showing the construction of an inductor fitting for introducing detergent into the stream of water that flows to the fountain brush assembly;

FIGURE 8 is a transverse section taken as indicated by the line 8—8 of FIGURE 7 showing the construction of the inductor fitting;

FIGURE 9 is a view partly in side elevation and partly in section showing the construction of the handle and the fountain brush carried thereby; and FIGURE 10 is a sectional view of the handle taken as indicated by the line 10—10 of FIGURE 9.

The essential parts of the apparatus shown in the drawings include: a diverter valve chamber, generally designated by numeral 20, that is best shown in FIGURES 3 and 6; a hot water valve generally designated 22 (FIGURE 1); an intake passage 24 extending from the hot water valve to the diverter valve chamber; a cold water valve generally designated 25, an intake passage 26 from the cold water valve to the diverter valve chamber; a swing spout 28 which serves as what may be termed the first discharge outlet of the apparatus; a first outflow passage 30 (FIGURE 3) for flow of water from the diverter valve chamber to the swing spout; a fountain brush assembly generally designated by numeral 32 (FIGURES 2 and 9) which includes a handle 34, a fountain brush 35, and a dual-passage flexible hose 36; a diverter valve member generally designated 38; a second outflow passage 40 (FIGURES 3 and 6) communicating with the fountain brush assembly; a valve operating means in the form of a valve stem 42 carrying the diverter valve member 38 and also carrying an external knob 44 by means of which it may be actuated; a container 45 for liquid detergent (FIGURE 3); an inductor fitting generally designated 46 (FIGURES 2 and 7) to which the dual-passage hose is connected, which inductor fitting is in communication with the second outflow passage and the detergent container for the purpose of introducing detergent into the stream of water in the fountain brush assembly; and, finally, means to control the induction of the detergent, which means includes a control port 48 on the handle conveniently positioned for closing by the finger of the operator.

The hot and cold water valves 22 and 25 which are of conventional construction as shown in FIGURE 2 have ornamental handles 49. The hot and cold water valves 22 and 25 are incorporated in a plumbing fixture casting 50 that forms the two intake passages 24 and 26 and has a forwardly extending cylindrical portion 52 into which the diverter valve body 21 is threaded as shown in FIGURE 3. The plumbing fixture casting 50 is adapted for connection to hot and cold water pipes 54 and 55 in a well known manner as indicated in FIGURE 1.

The plumbing fixture casting 50 carries and is concealed by a shroud 56. The shroud 56 is open at the bottom and has a top wall 58 which is apertured for the hot and cold water valves 22 and 25 and is also apertured for the swing spout 28. In addition, the top wall 58 of the shroud 56 has a large rectangular opening 60 that is normally closed by a cover 62. The cover 62 is removed when necessary for access to the container 45 for liquid detergent. In the construction shown, the detergent container 45 is rectangular and has a rim flange 65 (FIGURE 2) at each of its ends by means of which it is supported, the two rim flanges resting on corresponding offset portions 66 of the top housing wall 58.

The swing spout 28, which may be equipped with a well known aerator fitting 67, has a threaded cylindrical base portion 68 which is threaded into and is rotatable in a cylindrical portion 70 of the plumbing fixture casting 50. The base portion 68 of the swing spout has a circumferential groove in which is seated a suitable O-ring 72 to serve as a seal. The swing spout 28 is provided with a skirt 74 that conceals the cylindrical portion 70 of the plumbing fixture casting. The previously mentioned first outflow passage 30 is continued through the swing spout 28 as shown.

The plumbing fixture casting 50 together with the diverter valve body 21 forms the diverter valve chamber 20 and the plumbing fixture casting also provides a port 75 to the first outflow passage 30, the port being formed with a tapered valve seat 76 for cooperation with the diverter valve member 38. In addition, the plumbing fixture casting 50 provides a plurality of by-pass bores 78 from the diverter valve chamber 20 to the first outflow passage 30, these by-pass bores being arranged in a circle around the port 75.

The diverter valve body 21 is sealed in the plumbing fixture casting fitting 50 by a pair of spaced circumferential O-rings 80 and is formed with a circumferential groove 82 between the two O-rings. This circumferential groove 82 is in communication with the two intake passages 24 and 26 to receive water therefrom for flow into the diverter valve chamber 20. A plurality of inlet bores 84 arranged in a circle in the diverter valve body 21 around the diverter valve 20 extend from the circumferential groove 82 to the inner end of the diverter valve body and are on substantially the same circle as the previously mentioned by-pass bores 78. Thus inflowing water from the two intake passages 24 and 26 passing through the circumferential groove 82 and the inlet bores 84 is directed towards the by-pass bores 78.

A suitable resilient valve ring 85 is positioned between the inlet bores 84 and the by-pass bores 78, which valve ring may be made of suitable rubber-like material such as neoprene. Normally, the valve ring 85 is in a rearward position closing the by-pass bores 78, the valve ring being positioned against the by-pass bores by the force of inflowing water from the inlet bores 84. In the event a vacuum occurs in the two water pipes 54 and 55, however, the resulting reverse differential in pressure causes the valve ring to shift forward against the inlet bores 84 and this prevents backflow from the diverter valve chamber 20 into the domestic water system. It is apparent that this forward shift of the valve ring 85 in response to a reverse pressure differential opens the by-pass bores 78 and thus places the diverter valve chamber 20 in communication directly with the atmosphere through the first outflow passage 30 to the swing spout.

As shown in FIGURE 3 and 6, the end of the diverter valve chamber 20 at the second outflow passage 40 forms a second tapered valve seat 86. It is apparent that the inner circumferential wall 88 of the diverter valve chamber may also be considered a portion of the second outflow passage 40, the diverter valve member 38 as well as the diverter valve stem 42 being mounted for reciprocation in the second outflow passage longitudinally thereof.

The diverter valve member 38 is preferably in the form of a molded body of a rubber-like material and in the preferred practice of the invention, this molded body has three valve portions which may be considered as three separate valve elements carried by the valve stem 42. One of these valve elements is the nose portion 90 of the diverter valve member which is adapted to seat in the valve seat 76 to cut off flow to the first outflow passage 30 and thus divert flow from the diverter valve chamber 20 into the second outflow passage 40. Another of the valve elements is the opposite end portion 92 of the diverter valve member which is adapted to seat in the valve seat 86 to cut off flow to the second outflow passage 40 and thereby divert flow to the first outflow passage 30. The third valve element is what may be termed a check valve element or portion 94 in the form of a flared skirt that is dimensioned for sealing contact with the inner cylindrical wall 88 of the diverter valve chamber 20. When the nose portion 90 of the diverter valve member 38 is in the valve seat 76 to cut off the first outflow passage 30 and to cause water to be diverted to the second outflow passage 40, the skirt 94 is deflected radially inward by the flowing water but in the event there is any tendency for reverse flow to occur from the second outflow passage 40, the skirt responds by expanding into sealing contact with the surrounding circumferential wall 88.

The valve stem 42 extends forward through an aperture 95 in the shroud 56 and the knob 44 on the outer end of the valve stem has a cylindrical skirt 96 that extends into the aperture 95. To provide clearance for the rearward or inner movement of the cylindrical skirt 96, the diverter valve body 21 has a forward circular recess 98. The valve stem 42 is sealed by a suitable O-ring 100 that is confined in the circular recess 98 by a metal ring 102, this metal ring being slidably mounted on the valve stem 42. A suitable coil spring 104 surrounds the valve stem 42 between the knob 44 and the metal ring 102. It is apparent that the spring 104 has a dual function since it not only tends to urge the valve stem 42 to its outward position to seat the valve element 92 in the valve seat 86, but also provides the force for maintaining the O-ring 100 under sealing pressure.

The inductor fitting 46, which may be made of a suitable transparent or semi-transparent plastic material, may be mounted on a downwardly extending bracket 105 that is integral with the detergent container 45. As shown in FIGURE 7, the inductor fitting 46 may be secured on the bracket 105 by a plastic nut 106, the fitting having a circumferential shoulder 108 for contact with one side of the bracket with the nut 106 tightened against the other side.

The inductor fitting 46 has an inlet port in the form of a threaded nipple portion 110 to receive a stream of water from the diverter valve and has a second inlet port in the form of a lateral nipple 112 to receive detergent from the container 45. The water inlet port 110 communicates through a venturi throat 114 with a passage 115. The second inlet port formed by the lateral nipple 112 terminates in a restricted bore 116 that is directed radially into the passage 115 on the downstream side of the venturi float 114. A vent passage 118 communicates with the lateral nipple 112 and extends parallel to the first mentioned passage 115.

The nipple portion 110 of the inductor fitting 46 is connected to a plastic tube 120 that is in turn connected to a check valve 122 (FIGURE 3). The check valve 122 is threaded into the underside of the diverter valve body 21 in communication with a radial bore 124 which constitutes a continuation of the previously mentioned second outflow passage 40. The check valve 122 has a check valve member 125 which is under pressure from a coil spring 126 to prevent backflow in the second outflow passage 40.

The lateral nipple 112 of the inductor fitting 46 is connected by a plastic tube 128 with a nipple 130 on the underside of the plastic detergent container 45. As best shown in FIGURE 3, the nipple 130 is at the lower end of an upright passage 132 formed in the wall of the container, this upright passage being open to the atmosphere at the top of the container. A small feed bore 134 slants downward from the bottom of the interior of the container 45 into the upright passage 132 for gravity flow of the detergent into the plastic tube 128. It is contemplated that the plastic tube 128 will be provided with a suitable restricted orifice and for this purpose an orifice fitting 135 may be placed inside the tube, the orifice fitting having external screw threads for engagement with the tube.

The dual hose 36 is provided with an end fitting 136 of rigid plastic material by means of which it is connected to the inductor fitting 46. In the construction shown in FIGURE 7, the end fitting 136 is secured in position by a connector bushing 138 which engages a circumferential rib 140 of the end fitting. The end fitting 136 has a passage 115a which serves as a continuation of the passage 115 and has a second passage 118a which serves as a continuation of the passage 118. A suitable gasket 142 seals the joint between the end fitting 136 and the inductor fitting 46.

The dual hose 36 has a passage 115b which is a continuation of passages 115 and 115a and has a second passage 118b that is a continuation of the passages 118 and 118a. The handle 34 which is mounted on the second end of the hose is connected by a bushing 144 with a tapered nozzle member 145 that carries the fountain brush 35. The outer end of the nozzle member 145 has an enlarged inclined portion 146 spanned by a perforated disc 148 (FIGURE 9) and the fountain brush 35 is removably mounted thereon in a well known manner. The fluid discharged through the tapered nozzle member 145 is divided by the perforated disc 148 into a number of small streams that are released into the interior of the fountain brush 35.

The passage 115b of the dual hose 36 is directed into the nozzle member 145 but the second passage 118b of the dual hose terminates at the previously mentioned control port 48 on the handle 34. Preferably the control port 48 is spanned by a fine mesh screen 150 to keep foreign material out of the vent passage 118b. Preferably a clip 152 (FIGURES 2 and 3) is provided to hold the fountain brush assembly 32 when it is out of use. The clip is attached by screws 154 to a metal body 155 inside the shroud 56 and is formed with a pair of spaced opposed lips 156 and 158 to grip the tapered nozzle member 145. The clip 152 may be made of a suitable resilient plastic material so that the two lips 156 and 158 are flexible to a desirable degree.

The manner in which the described apparatus operates to serve its purpose may be readily understood from the foregoing description. When both of the hot and cold water valves 22 and 25 are closed, the diverter valve member 38 is held in its normal forward position by the concealed spring 104, and, of course, the knob 44 is also in its forward position. If either or both of the water inlet valves 22 and 25 are opened without rearward shift in position of the diverter valve member 38 by manual operation of the knob 44, the diverter valve member remains in its forward position closing the second outflow passage 40 and the water flows through the first outflow passage 30 to the spout 28. The path of the flowing water is through the circumferential groove 82 and the series of inlet bores 84 into the diverter valve chamber 20 and out of the diverter valve chamber through the port 75 to the first outflow passage 30. The impingement of the flowing water against the valve ring 85 seats the valve ring against the by-pass bores 78.

To divert the flowing water to the second outflow passage 40 to the tube 120 leading to the inductor fitting 46 for flow to the fountain brush assembly 32, the operator merely pushes the knob 44 forward to seat the nose portion 90 of the diverter valve member 38 in the tapered valve seat 76 to close the port 75. This manual operation of the knob 44 unseats the end portion 92 of the diverter valve member 38 from the tapered seat 86 to open the second outflow passage 40. As a result the flowing water is diverted through the diverter valve chamber 20 to the second outflow passage 40. The flowing water impinges against the valve ring 85 to close the by-pass bores 78 and the flowing water flexes the flared skirt 94 of the diverter valve member inward as it travels to the fountain brush assembly. As long as one of the hot and cold valves 22 and 25 is open to maintain this flow, the water pressure in the diverter valve chamber 20 holds the diverter valve member 38 in the valve seat 76. The diverted water passes through the check valve 122 and the plastic tube 120 to reach the inductor fitting 46 and then flows through the venturi throat 114 into passage 115.

When water is flowing through the passages 115, 115a and 115b to the fountain brush 35, no detergent is mixed with the flowing water if the control port 48 is open to the atmosphere. With the control port 48 open to the atmosphere, the suction effect at the restricted bore 116 adjacent the venturi throat 114 merely results in the suction of a small amount of air into the flowing water from the atmosphere through the port 48 and the passages 118b, 118a and 118.

If the control port 48 in the handle 34 is closed by finger pressure, the suction effect created by the venturi 114 creates a vacuum in the vent passage 118, 118b and 118a and thus causes a pressure differential across the orifice fitting 135 in the tube 128 to cause detergent to flow into the passage 115 through the restricted bore 116. The detergent is thoroughly mixed with the water in the passage 115, 115a and 115b. The detergent liquid is highly viscous and therefore does not flow through the orifice fitting 135 unless a relatively high pressure differential is placed across the fitting by the creation of the vacuum in the vent passage.

It is apparent that the apparatus incorporates a number of safeguards to prevent backflow from either the fountain brush assembly or the detergent container into the domestic water pipes to which the hot and cold valves 22 and 25 are connected. The first safeguard is the flexible valve ring 85 which is automatically sucked against the inlet bores 84 in the event the pressure in the inlet bores falls below atmospheric pressure. This action by the valve ring 85 places the diverter valve chamber 20 in communication with the atmosphere through the bypass bore 78 and the first outflow passage 30 to the spout 28 so that any vacuum that tends to form in the diverter valve chamber results in reverse flow of air through the spout. The second safeguard is the flared skirt or check valve portion 94 of the diverter valve member 38, this skirt expanding into sealing contact with the surrounding inner circumferential wall 88 in response to reverse flow. The third safeguard is the check valve 122 to which the plastic tube 120 is connected.

If the operator wishes to change the water flow from the fountain pressure assembly to the spout 28, it is merely necessary to pull the knob 44 forward to bring the end portion 92 of the diverter valve member 38 into the tapered seat 86. If water is flowing to the fountain brush assembly and the water flow is cut off by closing both of the hot and cold water valves 22 and 25, the water pressure that holds the diverter valve member in the valve seat 86 is terminated and the diverter valve member is returned to its normal forward position by the spring 104.

Our description in specific detail of the selected embodiment of the apparatus will suggest various changes, substitutions and other departures from our disclosure that properly lie within the spirit and scope of the appended claims.

We claim:

1. In a device having an inlet for connection to a pure water supply, a first discharge outlet in continuous communication with the atmosphere for discharging a stream of pure water and an alternate second discharge outlet subject to contamination, diverter valve means to divert flow from said first discharge outlet to said second discharge outlet and to prevent contaminated backflow from said second discharge outlet to said inlet, said diverter valve means having in combination: a diverter valve chamber in communication with said inlet; a first outflow passage from said chamber to said first discharge outlet; a second outflow passage from said chamber to said second discharge outlet; a diverter valve member in said chamber movable between a first position closing said first outflow passage to divert flow from said inlet to said second outflow passage and a second position closing said second outflow passage to divert flow from said inlet to said first outflow passage; and means to prevent backflow in said second outflow passage in response to lowering of pressure in said diverter chamber when said diverter valve member is in said first position closing said first outflow passage, said preventing means comprising: a by-pass passage from said chamber to said first outflow passage; and check valve means normally closing said by-pass and opening in response to a vacuum in the chamber thereby to place the chamber in communication with the atmosphere through said first outflow passage.

2. A combination as set forth in claim 1 in which said by-pass check valve means is positioned for impingement by flow into said chamber from said inlet to be urged thereby to its normal closed position.

3. A combination as set forth in claim 1 in which said inlet and said by-pass passage have adjacent ends with said check valve means positioned in a pressure-responsive manner between the two ends, whereby the check valve means normally closes said by-pass in response to impingement of water flowing from said inlet and shifts to close the inlet in response to a vacuum in the inlet thereby opening the by-pass to vent said chamber to the atmosphere through said first outflow passage.

4. A combination as set forth in claim 1 in which said check valve means is in the form of a circular member and in which said inlet comprises a circular series of relatively small bores directed against one side of the circular member and said by-pass comprises a circular series of bores extending from the other side of the circular member.

5. In a device having an inlet for connection to a pure water supply, a first discharge outlet in continuous communication with the atmosphere for discharging a stream of pure water and an alternate second discharge outlet subject to contamination, diverter valve means to divert flow from said first discharge outlet to said second discharge outlet and to prevent contaminated backflow from said second discharge outlet to said inlet, said diverter valve means having in combination: a cylindrical diverter valve chamber having a first outflow port at one end in communication with said first discharge outlet and a second outflow port at the opposite end in communication with said second discharge outlet, a portion of said chamber between said first and second ports being enlarged radially to form an annular space to receive water from said inlet; a plurality of inflow passages arranged around said diverter valve chamber and extending longitudinally thereof, said inflow passages being in communication with said inlet and terminating in said annular space; at least one by-pass passage on the opposite side of said annular space from said inflow passages, said by-pass passage communicating with said first outflow passage; and an annular valve member in said annular space, said valve member normally closing said by-pass passage and being responsive to a vacuum in the diverter valve chamber to move to a second position to open the by-pass and close said inflow passages.

6. In a valve-controlled dishwashing device for use with a supply of detergent and for mounting at a kitchen sink for the convenience of an operator, wherein the device has at least one inlet for connection to a water supply, a first normal discharge outlet for clear water and a second alternate discharge outlet for mixed water and detergent, diverter means movable from a normal first position to a second position to divert the water from said first normal discharge passage to said second alternate discharge passage thereby to cause the diverted water to exert a given force on the diverter means by fluid pressure to tend to keep the diverter means in its second position as long as the flow of the water continues, means to control said diverter means, and spring means to bias said control means, the improvement comprising: said control means being positioned on the front of the device for movement from a normal forward position to a rearward position retracted from the operator for moving the diverter means to its second position, said spring means biasing the control means towards its normal position and being preselected to exert less than said given force on the diverter means whereby the operator need merely push the control means rearward to divert water to said second alternate discharge passage as long as the water flow continues and said spring means will subsequently return the control means to its normal forward position automatically in response to cessation of the flow of water from the inlet.

7. In a dishwashing device for mounting on the plumbing at the rear side of a kitchen sink for use with a supply of detergent, said device having at least one inlet for connection to a water supply, a first discharge outlet for clear water and a second discharge outlet for mixed water and detergent, the combination therewith of:

a diverter valve chamber in communication with said inlet and said two outlets for fluid flow from the inlet to the two outlets;

control means extending forward from the dishwashing device, said control means having a normal forward position and being movable rearwardly to a second rear position;

yielding means urging said control means forward to its normal forward position;

valve means to control flow from the diverter chamber to said two outlets, said valve means having a normal first position cutting off said second outlet while permitting flow from the diverter chamber to the first outlet control means to move from its normal first position to its second position when the control means is moved from its normal forward position to its rearward position, said valve means in its second position diverting the flow of the water from said inlet to the second outlet thereby causing the diverted water to exert a given force by fluid pressure on the valve means to tend to keep the valve means at its second position as long as the diverted flow continues, the force exerted by said yielding means being less than said given force whereby the yielding means permits the given force to hold the valve means at its second position as long as the diverted flow continues and the yielding means returns the valve means to its normal first position in response to the drop of the fluid pressure in the diverter chamber when flow from the inlet to the diverter chamber ceases.

References Cited in the file of this patent

UNITED STATES PATENTS

| | | |
|---|---|---|
| 1,878,097 | Bletcher et al. | Sept. 20, 1932 |
| 2,652,850 | Manville | Sept. 22, 1953 |
| 2,710,020 | Manville | June 7, 1955 |
| 2,778,799 | Lindsay | Jan. 22, 1957 |
| 2,779,350 | Owens | Jan. 29, 1957 |
| 2,956,579 | Moore et al. | Oct. 18, 1960 |